US005931574A

United States Patent [19]

Uchida

[11] Patent Number: 5,931,574

[45] Date of Patent: Aug. 3, 1999

[54] AUTOMOBILE HEADLAMP WITH CONTINUOUS EDGES BETWEEN STEPPED SURFACES

[75] Inventor: Naoki Uchida, Shizuoka, Japan

[73] Assignee: Koito Manufacturing Co., Ltd., Tokyo, Japan

[21] Appl. No.: 08/739,748

[22] Filed: Oct. 29, 1996

[30] Foreign Application Priority Data

Nov. 2, 1995 [JP] Japan .................................... 7-310024

[51] Int. Cl.$^{6}$ ........................................................ B60Q 1/04

[52] U.S. Cl. ........................... 362/518; 362/346; 362/297

[58] Field of Search .................................... 362/346, 297, 362/518, 516

[56] References Cited

U.S. PATENT DOCUMENTS

| | | | |
|---|---|---|---|
| 1,405,140 | 2/1922 | Halvorson et al. | 362/277 |
| 3,511,983 | 5/1970 | Dorman | 240/41.15 |
| 3,710,095 | 1/1973 | Donohue et al. | 240/41.36 |
| 4,028,542 | 6/1977 | McReynolds, Jr. | 240/41.36 |
| 4,153,929 | 5/1979 | Laudenschlarger et al. | 362/348 |
| 4,566,056 | 1/1986 | Kouchi | 362/518 |
| 4,704,661 | 11/1987 | Kosmatka | 362/61 |
| 4,772,988 | 9/1988 | Brun | 362/61 |
| 4,779,179 | 10/1988 | Oyama et al. | 362/346 |
| 5,171,082 | 12/1992 | Watanabe | 362/61 |
| 5,192,124 | 3/1993 | Kawashima et al. | 362/61 |
| 5,406,464 | 4/1995 | Saito | 362/61 |
| 5,539,629 | 7/1996 | Chinniah et al. | 362/297 |

FOREIGN PATENT DOCUMENTS

| | | |
|---|---|---|
| 0 282 100 | 9/1988 | European Pat. Off. . |
| 25 07 858 | 9/1976 | United Kingdom . |

*Primary Examiner*—Sandra O'Shea
*Assistant Examiner*—Marshall Honeyman
*Attorney, Agent, or Firm*—Sughrue, Mion, Zinn, Macpeak & Seas, PLLC

[57] ABSTRACT

An automobile headlamp with a reflecting surface comprising a plurality of light distribution steps arranged on the surface. Out of the plurality of light distribution steps 12*a* constituting the reflecting surface 12, the light distribution steps 12*a*A, 12*a*B positioned at upper left and upper right corners with respect to an optical axis Ax of a reflector 10 are formed so that luminous fluxes of reflected light from upper areas A1, B1 thereof and luminous fluxes of reflected light from lower areas A2, B2 thereof can emit downward with broken lines interposed therebetween. As a result of this construction, even if headlamp parts forming accuracy requirements are not adequately met, undesired upward emitting of the luminous fluxes of reflected light from the upper areas A1, B1 is prevented. Further, by forming the upper areas A1, B1 and the lower areas A2, B2 of vertically long single light distribution steps 12*a*A, 12*a*B, respectively, not only division of the reflecting surface 12 into small segments can be minimized, but also steps between the upper areas A1, B1 and the lower areas A2, B2 are eliminated, so that the likelihood that upward scattered light will be generated is excluded.

15 Claims, 5 Drawing Sheets

AUTOMOBILE HEADLAMP WITH CONTINUOUS EDGES BETWEEN STEPPED SURFACES

BACKGROUND OF THE INVENTION

1. Field of the Invention

The present invention relates to an automobile headlamp having a reflector with a reflecting surface over which a plurality of light distribution steps are arranged.

2. Related Art

Many conventional automobile headlamps are constructed so that the light distribution of parallel luminous fluxes are controlled with lens steps, the parallel luminous fluxes being obtained-by rays of light reflected at a reflecting surface formed of a paraboloid of revolution.

However, in many of the headlamps a large inclination angle is set for their lens to meet recent demand in automobile design, and for such headlamps there is a limitation in the light distribution control based only on the lens steps. Further, there is a demand in design that a headlamp have improved external appearance through the transparency of lens.

In order to overcome such problems, lately developed are headlamps in which all or part of the light distributing functions performed by the lens is delegated to a reflector. That is, as disclosed in U.S. Pat. No. 5,171,082, a reflector in such headlamps is characterized as having a reflecting surface over which a plurality of light distribution steps are arranged and as obtaining desired light distribution characteristics either without forming lens steps or only by forming partially shallow lens steps by forming the light distribution steps into appropriate curved surfaces. A reflector having such a reflecting surface will hereunder be referred to as a "stepped reflector".

Such a stepped reflector requires that the reflecting surface of which be divided into a number of small segments. However, it is desired that the external appearance of a headlamp be improved by minimizing the division of the reflecting surface into small segments. Further, a horizontally extending step is formed along the border between the vertically adjacent light distribution steps on the stepped reflector. In this conjunction, a consideration must be made lest upward scattering light should be generated from such horizontally extending step by appropriately designing the direction of this horizontally extending step, and this has been one of the reasons why optical designing has been a complicated operation.

SUMMARY OF THE INVENTION

The present invention was made in view of these circumstances. Therefore, an object of the invention is to provide an automobile headlamp having a stepped reflector capable of improving the external appearance of the headlamp and simplifying optical designing.

The invention attempts to achieve the above object by constructing the light distribution steps to be disposed at a predetermined position so that rays of emitting light from a light source are reflected in vertically different directions in the upper area and in the lower area, respectively.

That is, the present invention is applied to an automobile headlamp having a reflector with a reflecting surface, the reflecting surface having a plurality of light distribution steps being arranged thereon, wherein out of the plurality of light distribution steps, light distribution steps arranged at a predetermined position are formed so that rays of light emitting from a light source are reflected in vertically different directions between an upper area and in a lower area of the light distribution steps, respectively.

The "predetermined position" is not limited to a specific position as long as such predetermined position is a position at which the luminous fluxes of reflected light from the light distribution steps must emit in vertically different directions in the upper area and in the lower area, respectivily, in the case where the light distribution steps are arranged at the predetermined position.

As indicated in the aforementioned construction, the invention is characterized as forming the light distribution steps to be disposed at a predetermined position out of the plurality of light distribution steps constituting the reflecting surface so that light rays emitting from the light source are reflected in vertically different directions in the upper and lower areas, respectively. Therefore, each light distribution step that has heretofore been formed while divided vertically into upper and lower segments because the design angles of reflection in the vertical direction are different can be replaced with a vertically long single light distribution step. As a result of this construction, division of the reflecting surface into small segments can be minimized, which in turn contributes to improving the external appearance of the headlamp. In addition, since there is no step present between the upper area and the lower area, the likelihood that scattered light will project upward attributable to the presence of the step is excluded, which in turn contributes to simplifying optical designing.

As described above, the invention allows an automobile headlamp having a stepped reflector to not only improve the external appearance thereof but also simplify optical designing.

By the way, if a cut line (a demarcation line between lightness and darkness) is formed in the luminous intensity distributing pattern of the auxiliary headlamp, the luminous fluxes of reflected light from the reflecting surface area positioned at the obliquely upper corners with respect to the optical axis of the reflector emit onto the vicinity of the lower part of the cut line in a manner similar to those from the stepped reflector that is constructed of an ordinary single paraboloid of revolution. If the accuracy requirements for reflecting surface area forming, bulb mounting, and filament forming are not adequately met, these luminous fluxes of reflected light may, in some cases, emit more upward than originally intended. In such a case, a phenomenon that the light distribution pattern gets out of the horizontal cut line in an upward direction occurs. Upward emitting causing this phenomenon of upward projection of the light distribution pattern tends to occur in an area closer to the upper end portions of the reflecting surface area.

Thus, the light distribution steps positioned at the obliquely upper corners with respect to the optical axis of the reflector are formed so that the luminous fluxes of reflected light from the upper areas emit more downward than the luminous fluxes of reflected light from the lower areas. As a result of this construction, occurrence of the upward projection of the light distribution pattern can be prevented even if parts forming accuracy requirements and the like are not adequately met.

DESCRIPTION OF THE PREFERRED EMBODIMENTS

A preferred embodiment of the present invention will now be described with reference to accompanying drawings.

Figure 1:
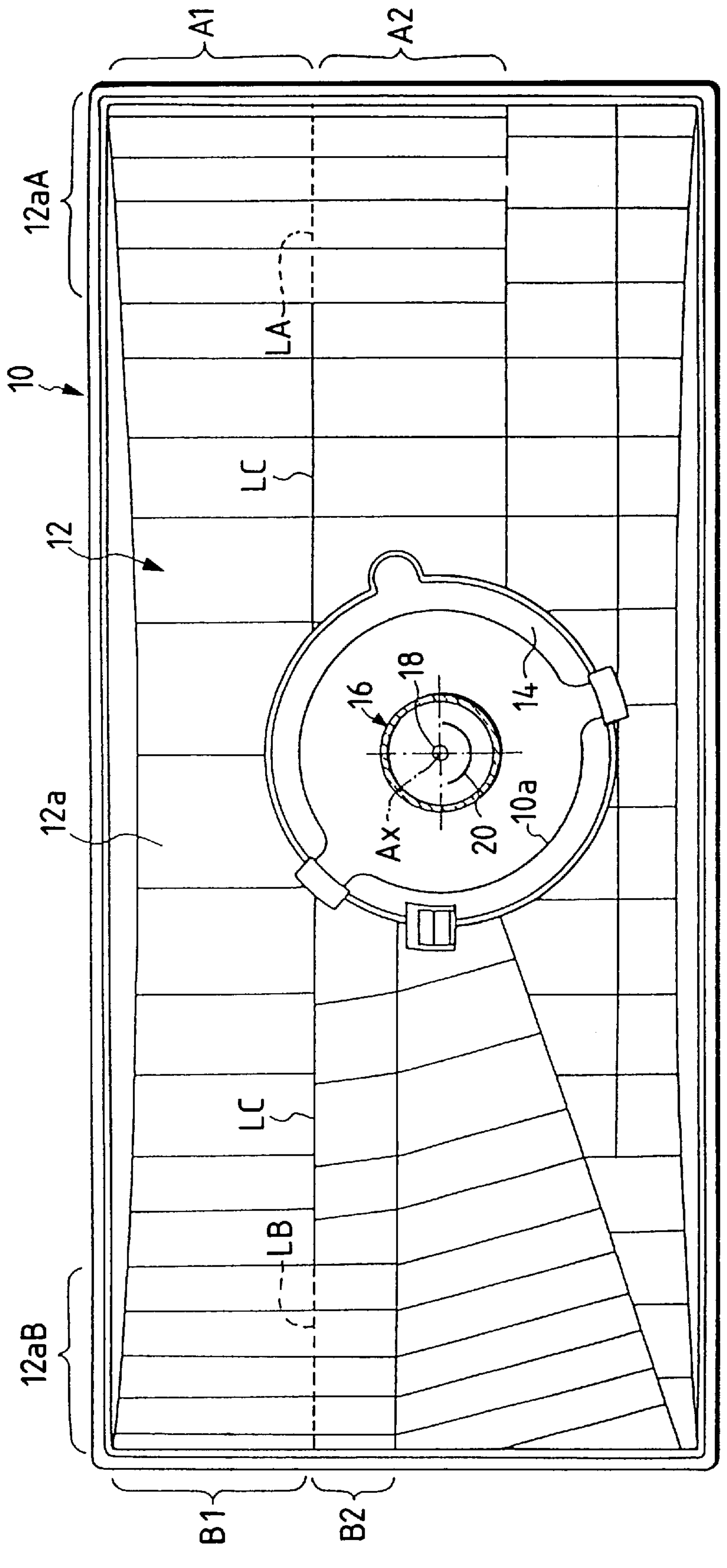
FIG. 1 is a front view showing an automobile headlamp, which is an embodiment of the invention.

FIG. 1 is a front view of an automobile headlamp, which is one embodiment of the invention.

As shown in FIG. 1, a reflector 10 of the automobile headlamp is a stepped reflector having a reflecting surface 12 that has a plurality of light distribution steps 12*a* arranged on a predetermined reference paraboloid of revolution. The reflector 10 is designed to generate a desired light distribution pattern as a headlamp without requiring lens-step-based light distribution control. It is for this reason that a plain lens is arranged in front of the reflector 10.

A bulb insertion hole 10*a* is formed in the apex in the rear of the reflector 10. An annular curved surface portion 14 that is formed of a paraboloid of revolution is arranged around the circumferential edge of the bulb insertion hole 10*a*. A bulb 16 is inserted into the bulb insertion hole 10*a*, and a filament 18 for the auxiliary headlamp thereof has the axis extending in the direction of an optical axis Ax of the reflector 10. In the vicinity of the lower part of the filament 18 for the auxiliary headlamp is a shade 20. The shade 20 is designed to shield downward emitting of light onto the lower part of the bulb 16 from the filament 18 for the auxiliary headlamp.

Figure 2:
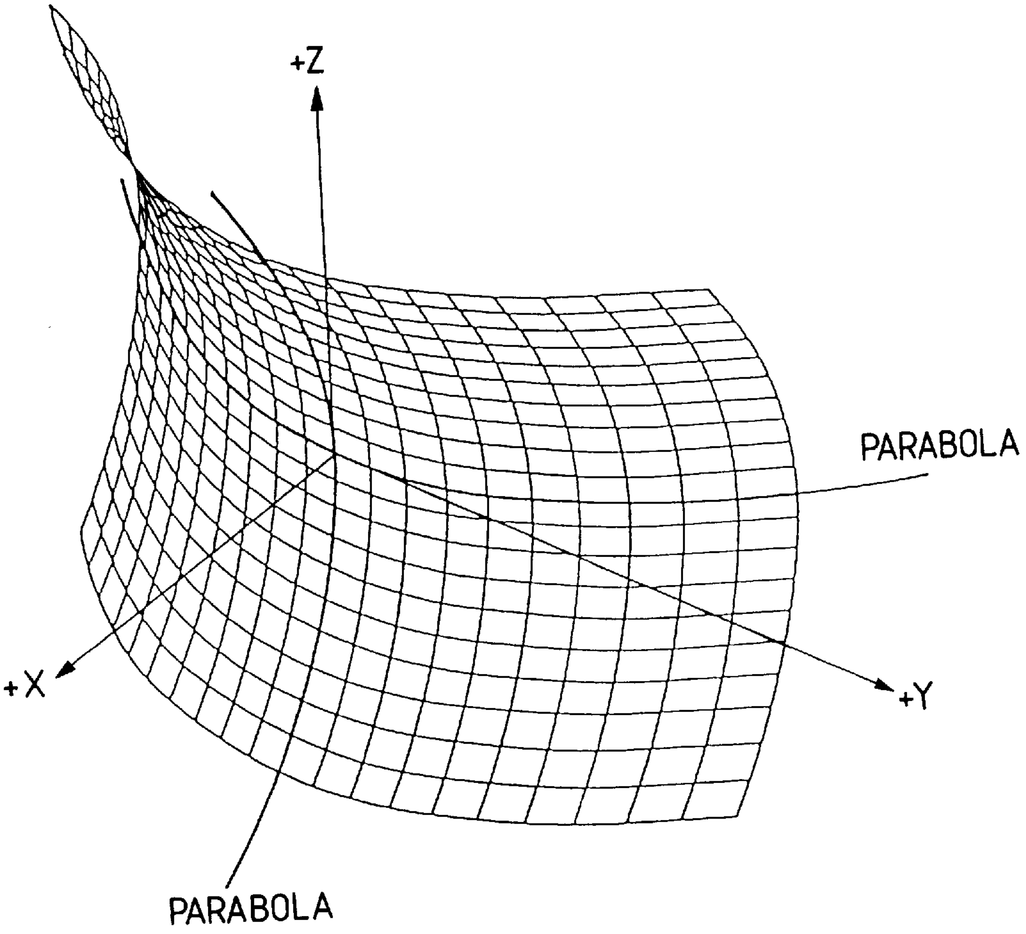
FIG. 2 is a perspective view showing the shape of a curved surface of each of light distribution steps constituting a reflecting surface of a reflector.

A plurality of light distribution steps 12*a* constituting the reflecting surface 12 are rectangular or obliquely inclined trapezoids. The respective light distribution steps 12*a* are formed of hyperbolic paraboloids set at corresponding positions on the reference paraboloid of revolution. Here by "the hyperbolic paraboloid" it is intended to mean a hyperbolic paraboloid that consists of a parabola, as shown in FIG. 2, in which a vertical section (or a section inclined by a predetermined angle from a vertical direction) extends toward the front of the headlamp and in which a horizontal section (or a section inclined by a predetermined angle from a horizontal direction) extends toward the rear of the headlamp, or a curved surface analogous to such a parabola.

By forming the respective light distribution steps 12*a* of hyperbolic paraboloids as described above, substantially parabolic horizontal sections can be obtained. Therefore, horizontally diffused rays of light formed by the luminous fluxes of reflected light from the light distribution steps 12*a* exhibit a more uniform horizontal light distribution than in the case where the light distribution steps are formed of simple arcuate horizontal sections. It should be noted that the focal distances of the parabolas forming the horizontal sections may be set to values different from each other between the right and left portions of a single light distribution step 12*a*. In this case, if the focal distances are set to appropriate values, then the borderline between adjacent light distribution steps 12*a* on the right and left sides can be eliminated.

Figure 3A:
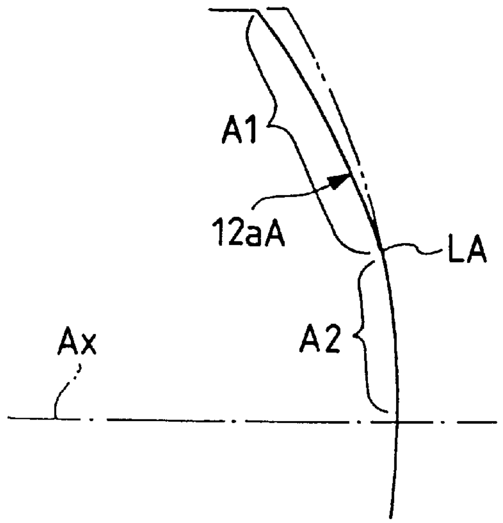
FIG. 3A is a side view and FIG. 3B is a perspective view showing light distribution steps positioned at the upper left corner (the upper right corner as viewed from the front of the headlamp) with respect to an optical axis of the reflector.
Figure 3B:
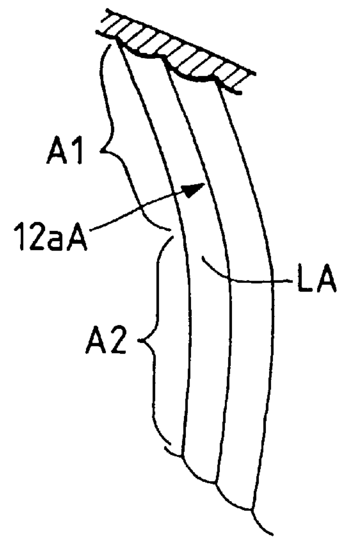

Out of the plurality of light distribution steps 12*a* constituting the reflecting surface 12 in FIG. 1, five light distribution steps 12*a*A positioned at the upper left corner (at the upper right corner as viewed from the front of the headlamp) with respect to the optical axis Ax of the reflector 10 are formed so that the luminous fluxes of reflected light from an upper area A1 with respect to a broken line shown in FIG. 1 can emit more downward than the luminous fluxes of reflected light from a lower area A2. That is, as shown in FIG. 3A, each of the light distribution steps 12*a*A has the vertical section thereof in the lower area A2 formed of a parabola having an axis that runs parallel with respect to the optical axis Ax, and has the vertical section thereof in the upper area A1 formed of a parabola having an axis that runs slightly obliquely downward with respect to the optical axis Ax. It may be noted that in both upper and lower areas A1 and A2 the horizontal section of each light distribution step 12*a*A is formed into the same parabola. Therefore, as shown in FIG. 3B, there is a bend, but not a step, along the borderline (along the broken line) between the upper and lower areas A1 and A2 of each light distribution step 12*a*A.

Figure 4A:
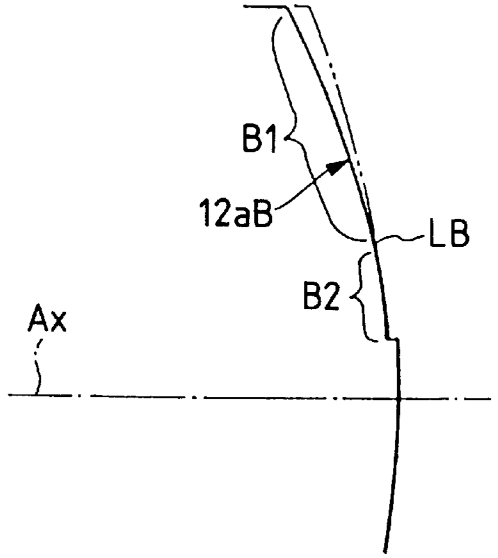
FIG. 4A is a side view and FIG. 4B is a perspective view showing light distribution steps positioned at the upper right corner (the upper left corner as viewed from the front of the headlamp) with respect to the optical axis of the reflector.
Figure 4B:
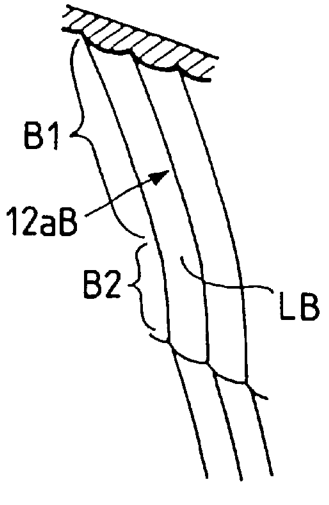

Likewise, out of the plurality of light distribution steps 12*a* constituting the reflecting surface 12 in FIG. 1, five light distribution steps 12*a*B positioned at the upper right corner (at the upper left corner as viewed from the front of the headlamp) with respect to the optical axis Ax of the reflector 10 are formed so that the luminous fluxes of reflected light from an upper area B1 with respect to a broken line shown in FIG. 1 can emit more downward than the luminous fluxes of reflected light from a lower area B2. That is, as shown in FIG. 4A, each of the light distribution steps 12*a*B has the vertical section thereof in the lower area B2 formed of a parabola having an axis that runs parallel with the optical axis Ax, and has the vertical section thereof in the upper area B1 formed of a parabola having an axis that runs slightly obliquely downward with respect to the optical axis Ax. It may be noted that in both upper and lower areas B1 and B2 the horizontal section of each light distribution step 12*a*B is formed into the same parabola. Therefore, as shown in FIG. 4A, there is a bend, but not a step, along the borderline (along the broken line) between the upper and lower areas B1 and B2 of each light distribution step 12*a*B.

As shown in FIG. 1, either of the five light distribution steps 12*a*A positioned at the upper left corner and of the five light distribution steps 12*a*B positioned at the upper right corner have bends LA or LB set so as to be level with the borderline LC of the light distribution steps 12*a* formed over the reflecting surface area positioned between the light distribution steps 12*a*A and 12*a*B.

Figure 5:
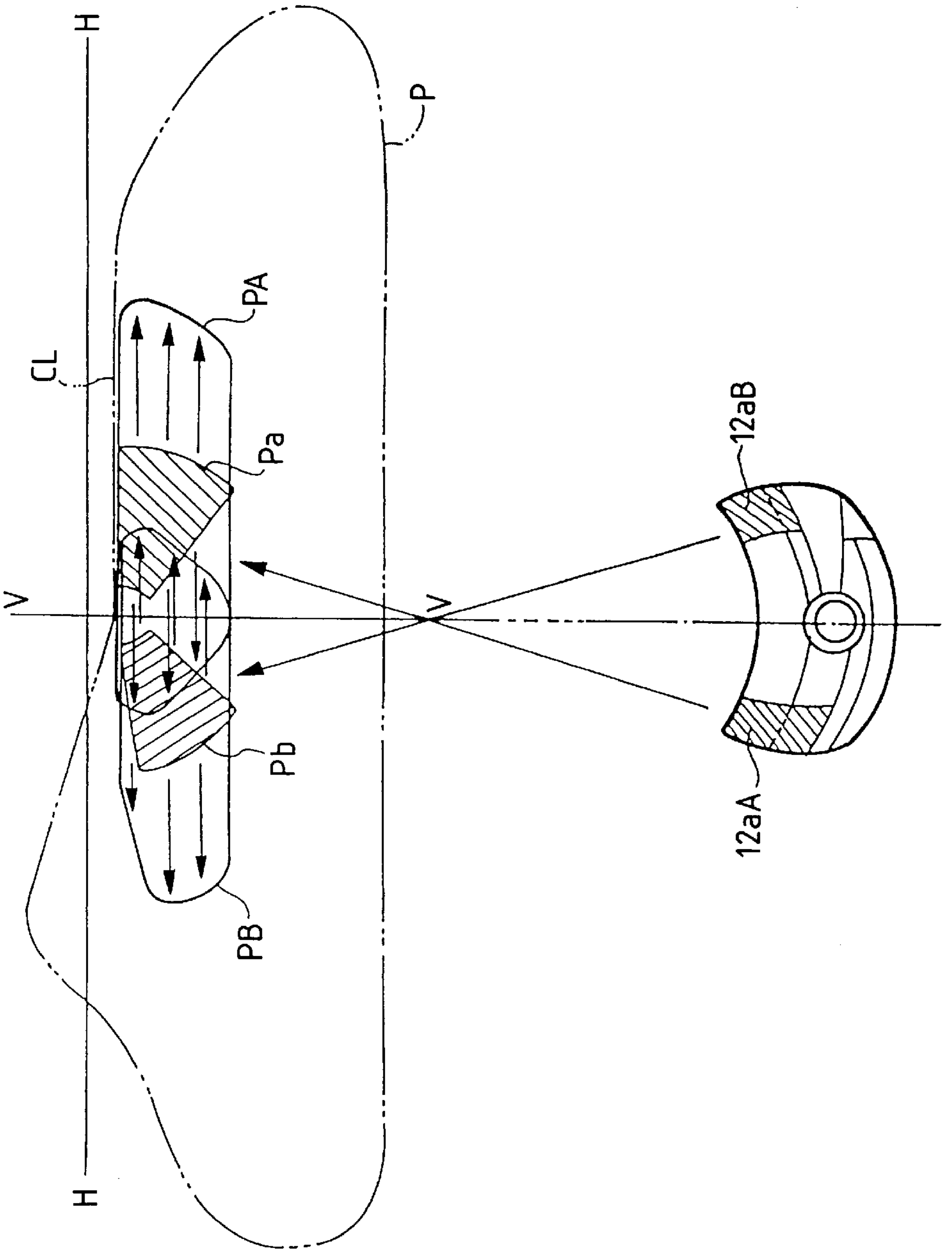
FIG. 5 is a diagram showing light distribution patterns formed by the reflector.

FIG. 5 is a diagram showing light distribution patterns formed by the luminous fluxes of reflected light from the light distribution steps 12*a*A and 12*a*B together with a light distribution pattern formed by the luminous fluxes of reflected light from the entire area of the reflecting surface 12 when the auxiliary headlamp is lit.

In FIG. 5, a light distribution pattern formed by the luminous fluxes of reflected light from the light distribution steps 12*a*A is denoted as PA; a light distribution pattern formed by the luminous fluxes of reflected light from the light distribution steps 12*a*B is denoted as PB; and a light distribution pattern formed by the luminous fluxes of reflected light from the entire area of the reflecting surface 12 is denoted as P. Further, in FIG. 5, light distribution patterns Pa, Pb shaded with slants are light distribution patterns formed when the angles of horizontal diffusion of the light distribution steps 12*a*A, 12*a*B are assumed to be zero.

Further, the respective light distribution steps 12*a*A, 12*a*B are such that the vertical sections thereof in the upper areas A1, B1 are formed of parabolas, each having a slightly obliquely downward axis with respect to the optical axis Ax as described above. Therefore, the luminous fluxes of reflected light from these upper areas A1 and B1 emit downward. If these axes are not downwardly inclined, a so-called phenomenon of "one-sidedly upwardly inclined light distribution" is likely to be observed, as will be described below.

Figure 6:
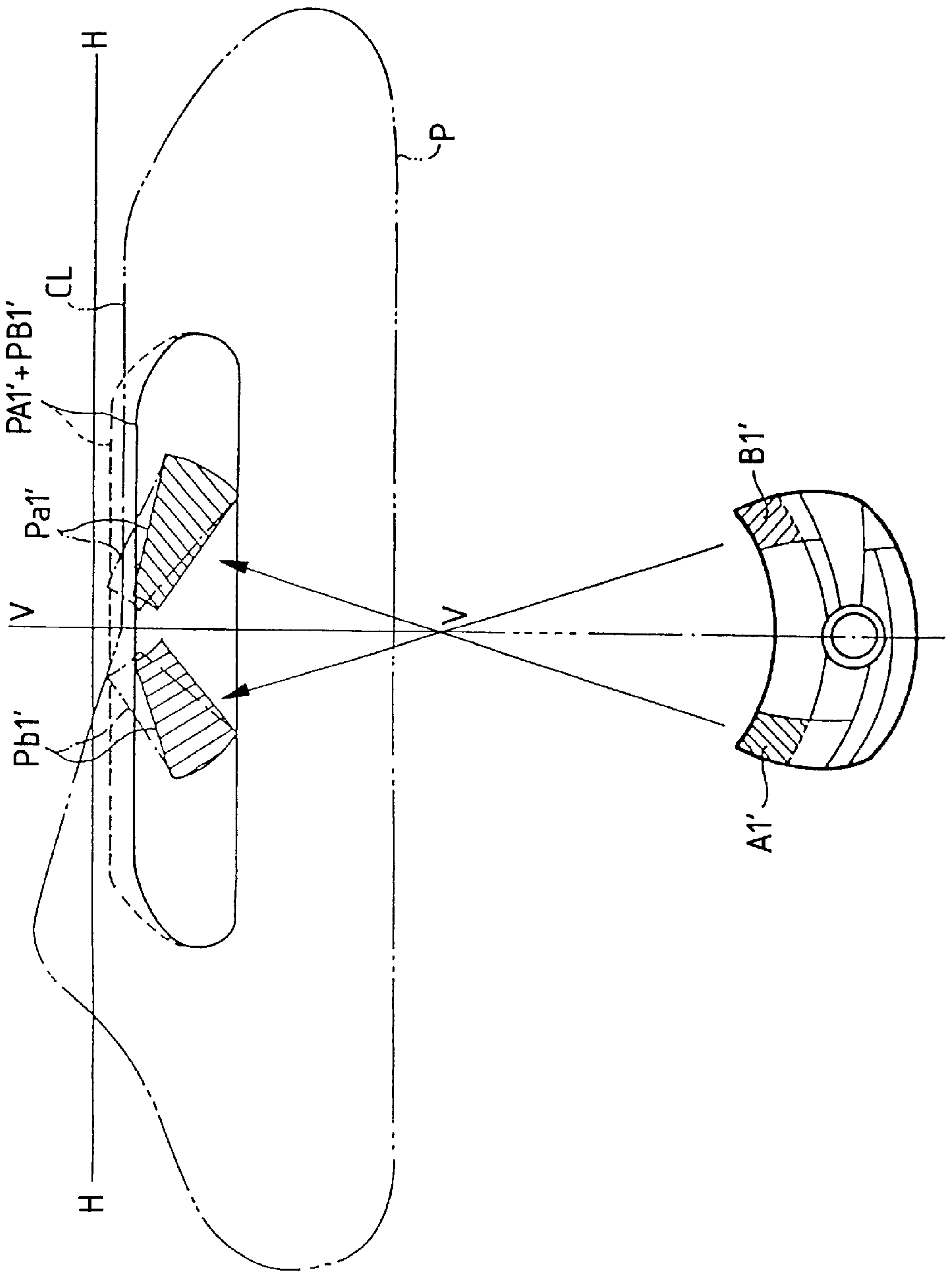
FIG. 6 is a diagram illustrative of the mode of an operation of the embodiment of the invention.

FIG. 6 shows light distribution patterns formed by the luminous fluxes of reflected light from upper areas A1', B1' if the vertical sections in the upper areas A1, B1 are not formed of the parabolas whose axes are downwardly inclined (in this case, the upper areas A1, B1 are denoted as A1', B1').

In FIG. 6, light distribution patterns Pa1', Pb1' are light distribution patterns to be formed by the luminous fluxes of reflected light from the upper areas A1', B1' if the angles of horizontal diffusion of the upper areas A1', B1' are supposed to be zero. These light distribution patterns Pa1', Pb1' appear at positions shaded with slants in FIG. 6 as long as there is no problem in terms of headlamp parts forming accuracy. Therefore, if these light distribution patterns Pa1', Pb1' are horizontally diffused, a light distribution pattern PA1'+PB1' such as shown by the solid line in FIG. 6 could be obtained. However, if surface forming accuracy for the reflecting surface area over which the areas A1', B1' are positioned, bulb 16 mounting accuracy, bulb 16 filament forming accuracy, and the like are not satisfactory, the so-called phenomenon of "one-sidedly upwardly inclined light distribution", in which the upper end portions of the light distribution patterns Pa1', Pb1' are projecting from a horizontal cut line CL as shown by the one dot chain lines in FIG. 6, often occurs. When this phenomenon of "one-sidedly upwardly inclined light distribution" has occurred, the light distribution pattern PA1'+PB1' obtained by horizontally diffusing the light distribution patterns Pa1', Pb1' gets out of the horizontal cut line CL in the upward direction as indicated by the broken line in FIG. 6, causing glare with respect to cars running in the opposite direction and the like.

On the other hand, the present embodiment is designed so that the luminous fluxes of reflected light from the respective upper areas A1, B1 emit obliquely downward. Therefore, even if headlamp parts forming accuracy and the like are not satisfactory, occurrence of the phenomenon of one-sidedly upwardly inclined light distribution caused by the light distribution patterns formed by the luminous fluxes of reflected light from the upper areas A1, B1 can be prevented. As a result, as shown in FIG. 5, a predetermined light distribution pattern can be obtained without having the diffused light projecting from the horizontal cut line CL.

The present embodiment is also designed so that the light distribution steps 12*a*A, 12*a*B are formed in such a manner that light rays emitting from the bulb 16 are reflected in vertically different directions in the upper areas A1, B1 and in the lower areas A2, B2, respectively. Therefore, each light distribution step conventionally formed in two parts, upper and lower, because the angles of reflection in the upper and lower directions are different can be replaced with a vertically long single light distribution step. As a result, division of the reflecting surface 12 into small segments can be minimized, allowing the external appearance of the headlamp to be improved. In addition, since there are no steps between the upper areas A1, B1 and the lower areas A2, B2, the possibility that upward scattered light will be generated is ruled out, which in turn contributes to simplifying optical designing.

It may be noted that there are bends along the border between the upper areas A1, B1 and the lower areas A2, B2, although there are no steps. These bends are almost negligible, but if one observes the steps meticulously, the presence of the bends can be visibly identified. Since the bend LA between the upper area A1 and the lower area A2 and the bend LB between the upper area B1 and the lower area B2 are set to be level with the borderline LC of the light distribution steps 12*a* formed over the reflecting surface areas between the bends LA and LB, unity in terms of aesthetic design can be ensured even if the presence of the bends can be visibly identified.

While the bends are present along the borderlines between the upper areas A1, B1 and the lower areas A2, B2 in the aforementioned embodiment, the bends can be eliminated if the upper areas A1, B1 are formed so as to be inclined gradually downward from the lower ends thereof toward the upper ends thereof. Since upward emitting that causes the phenomenon of one-sidedly upwardly inclined light distribution is gradually reduced from the upper ends toward the lower ends in the upper areas A1, B1, the degree of inclination of the upper areas can be gradually changed as described above, and such construction does not affect luminous intensity distributing characteristics.

Further, the example in which the respective light distribution steps 12*a* constituting the reflecting surface 12 are formed of hyperbolic paraboloids has been described in the aforementioned embodiment. However, the invention is not, of course, limited to such example. For example, the respective light distribution steps 12*a* can be formed of elliptic paraboloids or paraboloids of revolution. Here by the "elliptic paraboloid" it is intended to mean an elliptic paraboloid formed of a parabola in which both a vertical section (or a section inclined by a predetermined angle from the vertical direction) and a horizontal section (or a section inclined by a predetermined angle from the horizontal direction) extend toward the front of the headlamp, or a curved surface analogous to such a paraboloid.

What is claimed is:

1. An automobile headlamp comprising:

a reflector having a reflecting surface; and a plurality of light distribution steps arranged on said reflecting surface each said step in said group being defined by a step boundary, wherein at least one group of said light distribution steps is arranged at a predetermined position, each step in said group being further defined by a cross section along a vertical dimension of said step in said group that comprises a continuous curve, each said step in said group having an upper area and a lower area along said vertical dimension, and each said step in said group being formed so that light rays emitting from a light source are reflected in vertically different directions from the upper area and from the lower area of each said light distribution step.

2. The automobile headlamp according to claim 1, wherein said predetermined position is within a peripheral region of said reflector.

3. The automobile headlamp according to claim 1, wherein said peripheral region contributes to forming a cut line.

4. The automobile headlamp according to claim 2 or 3, wherein said predetermined position is located in an obliquely upper corner of the reflector with respect to an optical axis of the reflector and said light distribution steps arranged at said predetermined position are formed so that luminous fluxes of reflected light from the upper area emit more downward than luminous fluxes of reflected light from the lower area.

5. The automobile headlamp according to claim 1, wherein said group of the light distribution steps forms a sub-beam.

6. The automobile headlamp according to claim 1, wherein each of said light distribution steps is rectangular.

7. The automobile headlamp according to claim 1, wherein each of said light distribution steps is defined by obliquely inclined trapezoids.

8. The automobile headlamp according to claim 1, wherein each of said light distribution steps is defined by hyperblic paraboloids.

9. The automobile headlamp according to claim 1, wherein each of said light distribution steps is formed of elliptic paraboloids.

10. The automobile headlamp according to claim 1, wherein each of said light distribution steps is formed of paraboloids of revolution.

11. An automobile headlamp according to claim 1, wherein parabolas form horizontal sections in right and left portions of said distribution steps and focal distances of said parabolas forming said horizontal sections is set to values different from each other between a right an a left portion of each of said light distribution steps.

12. The automobile headlamp according to claim 1, wherein each of said light distribution steps has a vertical section thereof in the lower area formed of a parabola having an axis that runs parallel with respect to the optical axis, and has the vertical section thereof in the upper area formed of a parabola having an axis that runs slightly obliquely downward with respect to the optical axis.

13. The automobile headlamp according to claim 1, wherein each of said light distribution steps has a bend set so as to be level with a borderline of the light distribution steps formed over the reflecting surface area.

14. The automobile headlamp according to claim 1, wherein the upper areas of each of said light distribution steps is formed so as to be inclined gradually downward from the upper ends thereof toward the lower ends thereof.

15. The automobile headlamp according to claim 1, wherein, at least a second group of said light distribution steps is arranged at a second predetermined position, each step in said second group being further defined by a cross section along a vertical dimension of said step that comprises a continuous curve, each said step having an upper area and a lower area along said vertical dimension, and each said step being formed so that light rays emitting from a light source are reflected in vertically different directions from the upper area and from the lower area of each said light distribution step.

* * * * *